US012613627B2

(12) United States Patent
Sun et al.

(10) Patent No.: US 12,613,627 B2
(45) Date of Patent: Apr. 28, 2026

(54) INTERACTION METHOD, DEVICE, ELECTRONIC APPARATUS, STORAGE MEDIUM AND PROGRAM PRODUCT

(71) Applicant: Beijing Zitiao Network Technology Co., Ltd., Beijing (CN)

(72) Inventors: Hui Sun, Beijing (CN); Ming Li, Beijing (CN); Geng Huang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 19/094,640

(22) Filed: Mar. 28, 2025

(65) Prior Publication Data

US 2025/0335078 A1     Oct. 30, 2025

Related U.S. Application Data

(63) Continuation of application No. PCT/CN2024/089847, filed on Apr. 25, 2024.

(51) Int. Cl.
*G06F 3/04847*     (2022.01)
*G06F 40/205*     (2020.01)

(52) U.S. Cl.
CPC ........ *G06F 3/04847* (2013.01); *G06F 40/205* (2020.01)

(58) Field of Classification Search
CPC ........................... G06F 3/04847; G06F 40/205
See application file for complete search history.

(56) References Cited

U.S. PATENT DOCUMENTS 10,887,462 B1 *  1/2021  Coyer ..................... G06F 40/56
2014/0115466 A1 *  4/2014  Barak ................... G06F 3/0484
715/765

(Continued)

FOREIGN PATENT DOCUMENTS

CN      110377195 A     10/2019
CN      111933134 A     11/2020
(Continued)

OTHER PUBLICATIONS

International Search Report and Written Opinion for International Application No. PCT/CN2024/089847, mailed on Dec. 31, 2024, 14 pages.

(Continued)

*Primary Examiner* — Seth A Silverman
(74) *Attorney, Agent, or Firm* — Astute IP Law Group

(57) ABSTRACT

The present disclosure relates to an interaction method, device, electronic apparatus, storage medium and program product, and involves the technical field of artificial intelligence. The interaction method of the present disclosure comprises: displaying an interaction interface of a user and a first Agent; according to interaction information between the user and the first Agent, determining one or more interaction functions associated with the interaction information, wherein the one or more interaction functions are used to interact with the user based on an intention reflected in the interaction information; displaying operation controls of the one or more interaction functions; in response to the user's triggering of a target operation control in the operation controls of the one or more interaction functions, calling the interaction function corresponding to the target operation control to interact with the user.

20 Claims, 5 Drawing Sheets

(56) References Cited

U.S. PATENT DOCUMENTS

| 2018/0088742 | A1 | | 3/2018 | Lee | |
| 2019/0146761 | A1 | * | 5/2019 | de Andrade | G06F 8/38 |
| | | | | | 715/746 |
| 2019/0303988 | A1 | * | 10/2019 | Zellner | G06Q 50/01 |
| 2023/0244968 | A1 | * | 8/2023 | Gurin | G06N 3/0475 |
| | | | | | 706/11 |
| 2024/0013122 | A1 | * | 1/2024 | Pliner | G06Q 10/0637 |
| 2024/0354641 | A1 | * | 10/2024 | Miller | G06N 3/045 |
| 2024/0419484 | A1 | | 12/2024 | Wang et al. | |

FOREIGN PATENT DOCUMENTS

| CN | 113721819 | A | 11/2021 |
| CN | 116107464 | A | 5/2023 |
| CN | 117435290 | A | 1/2024 |
| CN | 117519528 | A | 2/2024 |
| CN | 117743542 | A | 3/2024 |

OTHER PUBLICATIONS

Extended European Search Report received for European Application No. 24866652.1, mailed on Oct. 10, 2025, 12 pages.

* cited by examiner

INTERACTION METHOD, DEVICE, ELECTRONIC APPARATUS, STORAGE MEDIUM AND PROGRAM PRODUCT

CROSS-REFERENCE TO RELATED APPLICATION

The present disclosure is a continuation application under 35 U.S.C. § 111(a) of International Patent Application No. PCT/CN2024/089847, filed on Apr. 25, 2024, the disclosure of which is hereby incorporated into this disclosure by reference in its entirety.

TECHNICAL FIELD

The invention relates to the technical field of artificial intelligence, in particular to an interaction method and device, an electronic apparatus, a storage medium and a program product.

BACKGROUND

With the development of Artificial Intelligence (AI) technology, Agents have gradually entered people's field of vision, and have been widely employed in various fields. Agents can be used to interact with users, for example, providing interaction services such as chat, question and answer, etc.

SUMMARY

This Summary is provided to introduce concepts in a brief manner, which will be elaborated in the Detailed Description later. This Summary is not intended to identify key features or essential features of the claimed technical solution, nor is it intended to limit the scope of the claimed technical solution.

According to some embodiments of the present disclosure, an interaction method is provided, comprising: displaying an interaction interface between a user and a first Agent; determining, according to interaction information between the user and the first Agent, one or more interaction functions associated with the interaction information, wherein the one or more interaction functions are configured to interact with the user based on an intention reflected in the interaction information; displaying one or more operation controls of the one or more interaction functions; and calling, in response to the user triggering a target operation control in the one or more operation controls of the one or more interaction functions, an interaction function corresponding to the target operation control to interact with the user.

According to some other embodiments of the present disclosure, an interaction device is provided, comprising: a first display module configured to display an interaction interface between a user and a first Agent; a determination module configured to: determining, according to interaction information between the user and the first Agent, one or more interaction functions associated with the interaction information; a second display module configured to display one or more operation controls of the one or more interaction functions; and an interaction module configured to call, in response to the user triggering a target operation control in the one or more operation controls of the one or more interaction functions, an interaction function corresponding to the target operation control to interact with the user.

According to further embodiments of the present disclosure, an electronic apparatus is provided, comprising one or more processors; and one or more memories, coupled to the one or more processors, for storing instructions which, when executed by the one or more processors, cause the one or more processors to perform the interaction method provided in any of the embodiments of the present disclosure.

According to still further embodiments of the present disclosure, a computer-readable storage medium is provided, on which a computer program is stored, which, when executed by a processor, causes the processor to perform the interaction method provided in any of the embodiments of the present disclosure.

According to yet further embodiments of the present disclosure, a computer program product is provided, comprising instructions which, when executed by a processor, cause the processor to implement the interaction method provided in any of the embodiments of the present disclosure.

According to still further embodiments of the present disclosure, a computer program is provided, comprising instructions which, when executed by a processor, cause the processor to implement the interaction method provided in any of the embodiments of the present disclosure.

Other features, aspects and advantages of the present disclosure will become clear from the following detailed description of exemplary embodiments of the present disclosure with reference to the drawings.

BRIEF DESCRIPTION OF THE DRAWINGS

Preferred embodiments of the present disclosure will be described below with reference to the drawings. The referred drawings, each of which is included in and forms a part of this specification together with the detailed description below, are provided to render a further understanding of the present disclosure, and serve to illustrate the present disclosure. It should be understood that the drawings in the following description only relate to some embodiments of the present disclosure, and do not constitute a limitation on the present disclosure. In the drawings.

Figure 1:
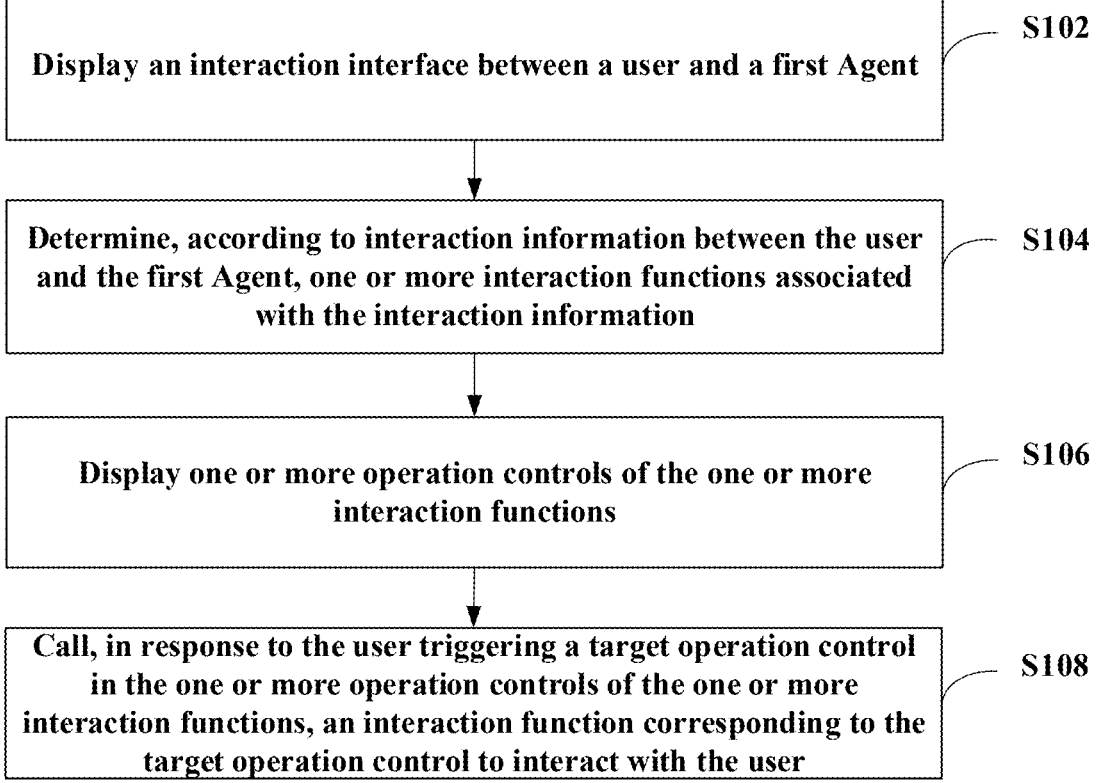
FIG. 1 is a flowchart of an interaction method provided in some embodiments of the present disclosure.

It should be understood that for the convenience of description, dimensions of various parts shown in the drawings are not necessarily drawn to their actual scales. The same or similar reference numerals are used in the drawings to indicate the same or similar parts. Therefore, once an item is defined in one drawing, it may not be discussed further in the subsequent drawings.

DETAILED DESCRIPTION

The technical schemes in the embodiments of the present disclosure will be clearly and completely described with reference to the drawings in below, but obviously, the described embodiments are only some of the embodiments of the present disclosure, not the whole of them. The following description of the embodiments is merely illustrative in nature and is in no way intended to limit the present disclosure, its application or uses. It should be understood that the present disclosure can be embodied in various forms and should not be construed as limited to the embodiments set forth herein.

It should be understood that steps described in the method embodiments of the present disclosure may be performed in a different order and/or in parallel. Furthermore, the method embodiments may include additional steps and/or omit performing the illustrated steps. The scope of the present disclosure is not limited in this respect. Unless otherwise specified, relative arrangements of parts and steps, numerical expressions and numerical values set forth in these embodiments should be interpreted as merely exemplary and not limiting the scope of the present disclosure.

The term "comprising" and its variants used in the present disclosure means an open term comprising at least its following elements/features, but not excluding other elements/features, that is, "comprising but not limited to". In addition, the term "including" and its variants used in the present disclosure means an open term including at least its following elements/features, but not excluding other elements/features, that is, "including but not limited to". Therefore, "comprising" is synonymous with "including". The term "based on" means "at least partially based on".

Reference throughout this specification to "an embodiment", "some embodiments" or "embodiments" means that a particular feature, structure or characteristic described in connection with the embodiment is included in at least an embodiment of the present invention. For example, the term "an embodiment" means "at least one embodiment"; the term "another embodiment" means "at least one other embodiment"; the term "some embodiments" means "at least some embodiments". Moreover, the appearances of the phrases "in an embodiment", "in some embodiments" or "in embodiments" in various places throughout the specification do not necessarily all refer to the same embodiment, but they may also refer to the same embodiment.

It should be noted that the concepts of "first", "second" and the like mentioned in the present disclosure are only used to distinguish different devices, modules or units, and are not used to limit the order or interdependence of functions performed by these devices, modules or units. Unless otherwise specified, the concepts of "first", "second" and the like are not intended to imply that the objects so described must be in a given order in time, space, ranking or in any other way.

It should be noted that the modifications of "one" and "multiple" mentioned in the present disclosure are schematic rather than limiting, and those skilled in the art should understand that unless the context clearly indicates otherwise, they should be understood as "one or more".

Names of messages or information exchanged among multiple devices in the embodiment of the present disclosure are only used for illustrative purposes, and are not used to limit the scope of these messages or information.

Embodiments of the present disclosure will be described in detail with reference to the drawings, but the present disclosure is not limited to these particular embodiments.

The following particular embodiments can be combined with each other, and the same or similar concepts or processes may not be repeated in some embodiments. Furthermore, in one or more embodiments, specific features, structures, or characteristics can be combined in any suitable manner that will be apparent to those skilled in the art from the present disclosure.

An Agent can be realized based on Artificial Intelligence technology such as Large Model, etc., and can interact with a user. One or more Agents can be realized in one application (APP) or client, and each Agent can realize one or more interaction functions. For example, different Agents can be created based on different roles, scenarios, fields, functions and the like, and different interaction functions can be used to achieve interactions with a user based on different dimensions such as roles, scenarios, tool functions, fields, etc. For example, one Agent or different Agents can implement various interaction functions such as chat, translation, Question and Answer of knowledge in a certain field, or the like.

Different interaction functions can interact with a user based on different dimensions, and can provide response information to the user more accurately. The user can search for an interaction function and trigger a control of the interaction function to call the interaction function for interaction. However, in a case where there are multiple interaction functions, the user are difficult to fast find the interaction function to trigger the required interaction function to implement an accurate interaction.

The present disclosure provides an interaction method, which can improve the efficiency and accuracy of interactions with users and is described below in conjunction with FIGS. 1~4.

FIG. 1 is a flow chart of some embodiments of an interaction method in the present disclosure. As shown in FIG. 1, the method of this embodiment comprises steps S102~S108.

In step S102, an interaction interface between a user and a first Agent is displayed.

The first Agent can interact with the user based on a machine learning model, and content of the interaction can include various forms of content, such as texts, voices, images, etc., on which there is no restriction here. The machine learning model is, for example, LLM (Large Language Model), and is not limited to the cited examples. The first Agent can be a default Agent or a basic Agent in an application, for example, in response to the user triggering an interaction control in the application, the interaction interface between the user and the first Agent is displayed.

The first Agent can be created based on a specific role, scenario, field, function and the like. For example, the first Agent is an Agent playing a specific role for the interaction with the user, or the first Agent is an Agent which interacts with the user by simulating a specific plot (scenario), or the first Agent is equipped with knowledge in a specific field and can interact with the user based on the knowledge in the specific field, or the first Agent, as a specific tool, can interact with the user based on a function of the tool. The first Agent can be created by a user and can also be provided by an application or client itself, and can be created based on actual needs, not limited to the cited examples. The first Agent can also implement one or more interaction functions. For example, in response to the user triggering the interaction function of the first Agent, the interaction interface between the user and the first Agent is displayed.

In step S104, one or more interaction functions associated with interaction information between the user and the first Agent are determined according to the interaction information.

The user can input information through various forms such as texts, voices and the like in the interaction interface, and the first Agent can then generate response information. The input information of the user and response information can be taken as the interaction information between the user and the first Agent.

The interaction information between the user and the first Agent can be parsed by using the machine learning model to determine the user's intention, and thereby the one or more interaction functions associated with the interaction information are determined. The machine learning model is, for example, the machine learning model corresponding to the first Agent.

For example, the one or more interaction functions can be used to interact with the user based on the intention reflected in the interaction information. For example, the interaction information reflects that the user wants to interact with some specific role, and then an interaction function corresponding to the specific role is determined as the interaction function associated the interaction information. For example, the interaction information reflects that the user wants to learn knowledge in a specific field, and then an interaction function corresponding to this specific field is determined as the interaction function associated the interaction information. The one or more interaction functions can be interaction functions for interacting with the user based on different dimensions. The one or more interaction functions can correspond to the first Agent and can also correspond to Agents other than the first Agent. In a case where there are multiple interaction functions, the multiple interaction functions can partly correspond to the first Agent and partly correspond to other Agents.

In step S106, one or more operation controls of the one or more interaction functions are displayed.

The interaction interface between the user and the first Agent can include a display area of interaction information which can be used to display the interaction information between the user and the first Agent, and an input area of interaction information which can be used to receive the user's input operation and can also display input information. The one or more operation controls of the one or more interaction functions can be displayed in the display area, and the one or more operation controls of the one or more interaction functions can also be displayed in the input area. Based on the interaction information between the user and the first Agent, the one or more interaction functions associated with the interaction information can be automatically recommended to the user.

In step S108, an interaction function corresponding to a target operation control is called to interact with the user, in response to the user triggering the target operation control in the one or more operation controls of the one or more interaction functions.

In response to the user triggering the target operation control, the corresponding interaction function can be directly called to interact with the user. If the interaction function corresponding to the target operation control is the interaction function corresponding to the first Agent, the first Agent interacts with the user based on the interaction function. If the interaction function corresponding to the target operation control belongs to another Agent, the another Agent can be called to interact with the user based on the interaction function.

In the method of the above embodiments, during the interaction process between the user and the first Agent, based on the interaction information between the user and the first Agent, the one or more interaction functions associated with the interaction information are determined and displayed to the user. Since the one or more interaction functions are determined based on the intention reflected in the interaction information, the one or more interaction functions corresponding to the user's intention can be automatically recommended and displayed to the user based on the interaction information, without the need to search for the required interaction function by the user. After the user triggers the target operation control, the interaction function corresponding to the target operation control can be directly called to interact with the user based on the user's intention, thus improving the efficiency and accuracy of the interaction with the user.

The interaction function can be a function of controlling output of the Agent based on Prompt to obtain a specific type of response generated by the Agent. The interaction function can also be an interaction function of the Agent that has been created and can generate a specific type of response. The difference between the two cases is that in the former case, the response generated by the Agent itself may not fully meet the requirements, and the model corresponding to the Agent can be guided to output the specific type of response based on the Prompt, while in the latter case, the Agent itself can generate the specific type of response that meets the requirements.

In some embodiments, the one or more interaction functions associated with interaction information comprise: one or more of an interaction function based on a role associated with the interaction information, an interaction function based on a field associated with the interaction information, an interaction function based on a scenario associated with the interaction information, and an interaction function based on a tool associated with the interaction information. The interaction functions can be distinguished from different dimensions such as a role, field, scenario, tool, etc.

Information of interaction functions in an application or client can be pre-configured in an interaction function library, and the one or more interaction functions associated with the interaction information can be acquired from the interaction function library based on the interaction information between the user and the first Agent. It is described below in connection with some embodiments that how to determine the one or more interaction functions associated with the interaction information according to the interaction information between the user and the first Agent.

In some embodiments, the intention reflected in the interaction information is understood and summary information corresponding to the interaction information is generated by using a machine learning model; the one or more interaction functions associated with the interaction information is determined from an interaction function library according to the summary information.

The machine learning model is, for example, LLM model, etc. The latest piece of interaction information and a preset number of pieces of interaction information can be input into the machine learning model to obtain the summary information, which is matched with information of various interaction functions in the interaction function library to determine the one or more interaction functions associated with the interaction information.

In some embodiments, one or more types matched with the summary information is determined according to the summary information; and from each of the one or more types of interaction functions in the interaction function library, an interaction function matched with the summary information is selected to obtain the one or more interaction functions associated with the interaction information.

Different interaction functions can be classified into one or more types and stored separately. For example, the interaction functions can be classified into a role type, field type, tool type, scenario type, etc., which is not limited to the cited examples. A interaction function can belong to multiple types. The one or more types matched with the summary information can be determined according to the summary information. For example, the summary information obtained based on the interaction information between the user and the first Agent includes a character, it can be determined that the type matched with the summary information includes the role type, and in turn it can be determined whether there is an interaction function corresponding to this character in the interaction functions of the role type.

In the method of the above embodiments, the machine learning model is used to parse the interaction information, and to generate the summary information according to the intention of the interaction information, and then the summary information is matched with the interaction functions, improving the accuracy of the determined interaction function.

In some embodiments, the interaction information is parsed to extract a keyword of the interaction information by using a machine learning model; and the one or more interaction functions associated with the interaction information from the interaction function library are determined according to the keyword.

The information of the interaction function includes, for example, identification and description information of the interaction function, and the description information can be used to describe a name of a particular role, field, tool function, or scenario and the like corresponding to the interaction function. The information of the interaction function can also include a type of the interaction function. The one or more interaction functions associated with the interaction information can be obtained by directly extracting the keyword and matching the keyword with the information of various interaction functions in the interaction function library.

In some embodiments, the one or more types matched with the keyword are determined; from each of the one or more types of interaction functions in the interaction function library in the interaction function library, an interaction function matched with the keyword is selected to obtain the one or more interaction functions associated with the interaction information.

For example, the keyword can include an entity word corresponding to an entity category, and according to the entity category, the one or more types matched with the keyword can be determined, and then the one or more interaction functions matched with the keyword can be selected from each type of interaction functions.

In the method of the above embodiments, the interaction information is parsed through the machine learning model to extract the keyword, and the keyword is matched with the interaction functions, improving the accuracy of the determined interaction function.

The above methods of determining the one or more interaction functions associated with the interaction information based on the summary information and the keyword can be applied in combination. The summary information and the keyword are determined by using the machine learning model, and according to the summary information and the keyword, the one or more interaction functions associated with the interaction information are determined from the interaction function library. For details, please refer to the previous embodiments, and the details are not repeated here.

In some embodiments, one or more candidate interaction functions are obtained according to the summary information and/or the keyword, and an interaction function(s) associated with the one or more candidate interaction functions are determined according to the one or more candidate interaction functions, and the one or more candidate interaction functions and the interaction function(s) associated with the one or more candidate interaction functions are taken as the one or more interaction functions associated with the interaction information.

According to matching results of the summary information and/or the keyword, the number of the interaction functions can be expanded to provide the user with more optional interaction functions, which facilitates the user's operation and improves interaction efficiency. For example, an interaction function corresponding to a role related to a role of a candidate interaction function can be determined, an interaction function associated with the candidate interaction function can be determined in a field of the candidate interaction function, an interaction function associated with the candidate interaction function can be determined in a scenario of the candidate interaction function, and/or an interaction function related to a tool function of the candidate interaction function can be determined. The association relationship between the interaction functions can be pre-configured.

Figure 2:
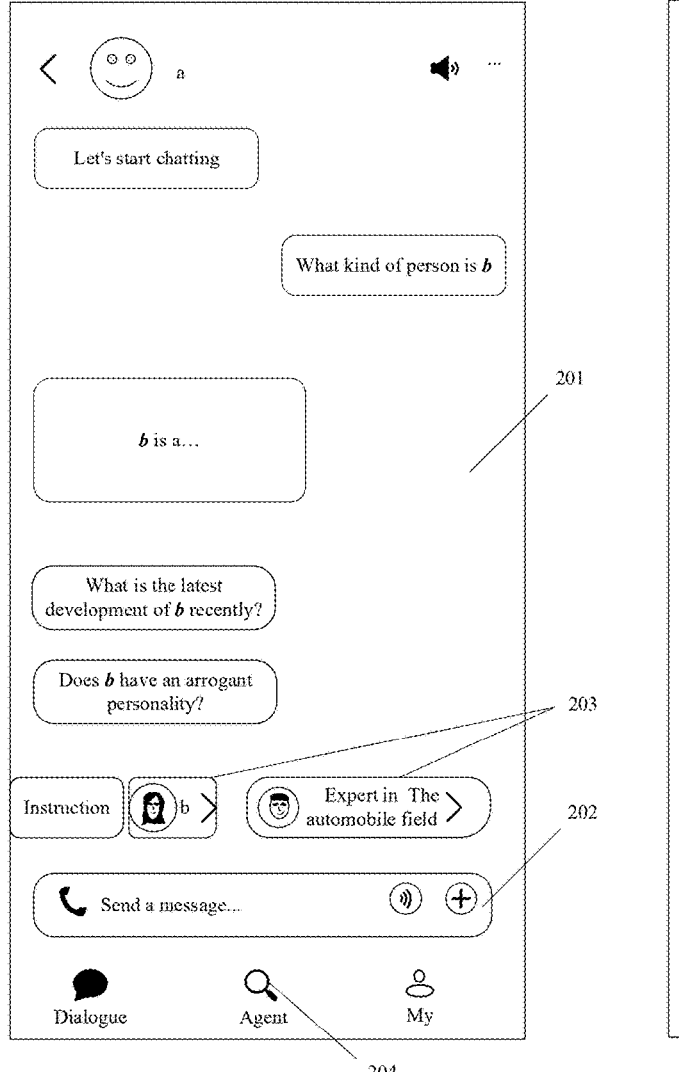
FIG. 2 is schematic diagrams of an interaction interface provided in some embodiments of the present disclosure.

After determining the one or more interaction functions associated with the interaction information, the one or more operation controls of the one or more interaction functions can be displayed. As shown in FIG. 2, in the interaction interface between the user and the first Agent "a", the interaction information between the user and "a", is displayed in a display area 201. During an interaction process, the user mentions that "What kind of person is b". Based on the method of the above embodiments, it can be determined that the one or more interaction functions associated with the interaction information include an interaction function of an Agent corresponding to "b", and "b" belongs to people in the automobile field. The one or more interaction functions associated with the interaction information can also include an interaction function of an Agent corresponding to experts in the automobile field, etc. As shown in FIG. 2, the operation controls 203 of the one or more interaction functions can be displayed in the display area 201 of the interaction interface near the input area 202. The identification information such as images, titles, or the like corresponding to the Agents can be displayed in the operation controls 203 of the interaction functions, which is convenient for the user to view, thereby improving the efficiency of selection and interaction.

The role corresponding to the Agent can be a real person or a virtual person. The specific role played or imitated by the Agent in the present disclosure is authorized by relevant personnel, such as the role itself, the creator of the role, or the like.

As shown in FIG. 2, the first Agent "a" can generate and display response information according to the input information of the user, for example, the response information about "What kind of person is b". The first Agent a can also generate candidate questions to facilitate the user to further interact with the first Agent. The candidate questions are generated according to interaction information. These candidate questions are different from the interaction functions. A candidate question is information of a single interaction and can be candidate information input by the user, thus improving the efficiency of user input. While during execution, the interaction function can make the corresponding Agent interact with the user for multiple rounds, and each round of interaction can generate a specific type of response. The specific type can be determined based on actual needs.

The one or more interaction functions associated with the interaction information can be one or more interaction functions corresponding to the first Agent, and can also be one or more interaction functions corresponding to another Agent, which are described below for different situations.

Focusing on a situation that the one or more interaction functions associated with the interaction information include one or more interaction functions corresponding to the first Agent, in some embodiments, the interaction function corresponding to the target operation control is a first interaction function corresponding to the first Agent, and prompt information corresponding to the first interaction function is obtained in response to the user triggering the target operation control; the first interaction function corresponding to the first Agent is generated according to the prompt information; and the first Agent is used to interact with the user based on the first interaction function.

The first interaction function can be obtained by adjusting the machine learning model corresponding to the first Agent based on the prompt information (Prompt). The target operation control can be associated with the prompt information corresponding to the first interaction function, and the prompt information can be input into the machine learning model corresponding to the first Agent in response to the user triggering the target operation control, so as to obtain the first interaction function. For example, the first interaction function is a function of mutual translation between Chinese and English, and the prompt information can include description information of a task of mutual translation between Chinese and English, description information of output requirements, etc., and after the user triggers the operation control of mutual translation between Chinese and English, the first Agent performs the interaction of mutual translation between Chinese and English with the user, that is, if the user inputs Chinese, the first Agent responds with an English translation, and if the user inputs English, the first Agent responds with a Chinese translation.

The interaction function can improve the efficiency and accuracy of interaction. The user does not need to repeatedly input prompt information to the Agent, and does not need to adjust the form of the input information based on the Agent's response in order to enable the Agent to output a response that meets the requirements.

According to the method in the above embodiments, the prompt information can be directly acquired based on the user's triggering of the target operation control, and the first interaction function can be obtained based on the prompt information, so that the first Agent can interact with the user based on the first interaction function, thereby increasing the efficiency of calling the first interaction function by the user and in turn improving the efficiency and accuracy of the interaction.

In some embodiments, guidance information of starting the first interaction function is displayed in the interaction interface between the user and the first Agent; in response to first information input by the user based on the guidance information, response information generated by the first Agent according to the first information and the first interaction function is displayed.

For example, the guidance information of starting the first interaction function can be displayed in the display area or the input area. For example, a preset effect can be used to display "mutual translation between Chinese and English" in the input area, for another example, the guidance information such as "mutual translation between Chinese and English now" or the like can be displayed in the display area, and the guidance information such as requirements for the input information of the user can also be displayed, not limited to the cited examples. The first Agent uses the first interaction function to produce the response information according to the first information input by the user and the response information is displayed in the interaction interface.

Through the prompt of the guidance information, it is helpful for the user to carry out subsequent interaction operations, thereby enhancing the user's operating experience and improving the efficiency and accuracy of interactions.

Focusing on a situation that the one or more interaction functions associated with interaction information include an interaction function corresponding to a second Agent, in some embodiments, the interaction function corresponding to the target operation control is a second interaction function corresponding to the second Agent, and the second Agent is called to interact with the user based on the second interaction function, in response to the user triggering the target operation control.

The second Agent can be a pre-created Agent with the second interaction function. The user triggers the target operation control, and it is switched from the first Agent to the second Agent to interact with the user.

In some embodiments, an interaction interface between the user and the second Agent is displayed; in response to second information input by the user in the interaction interface between the user and the second Agent, response information generated by the second Agent is displayed according to the second information and the second interaction function.

The user can input the second information in the form of a text, voice, etc., and the second Agent can directly interact with the user to generate the response information.

In some embodiments, initial input information is generated according to historical input information related to the second interaction function, and the initial input information is displayed in the interaction interface between the user and the second Agent, and response information corresponding to the initial interaction information generated based on the second interaction function is displayed. For example, the initial input information can be generated by changing the form of a subject or the like of a question asked by the user regarding the second interaction function, and then a corresponding answer can be automatically generated. This can reduce the user's operations, improve the interaction efficiency, and enhance the user experience.

Figure 3:
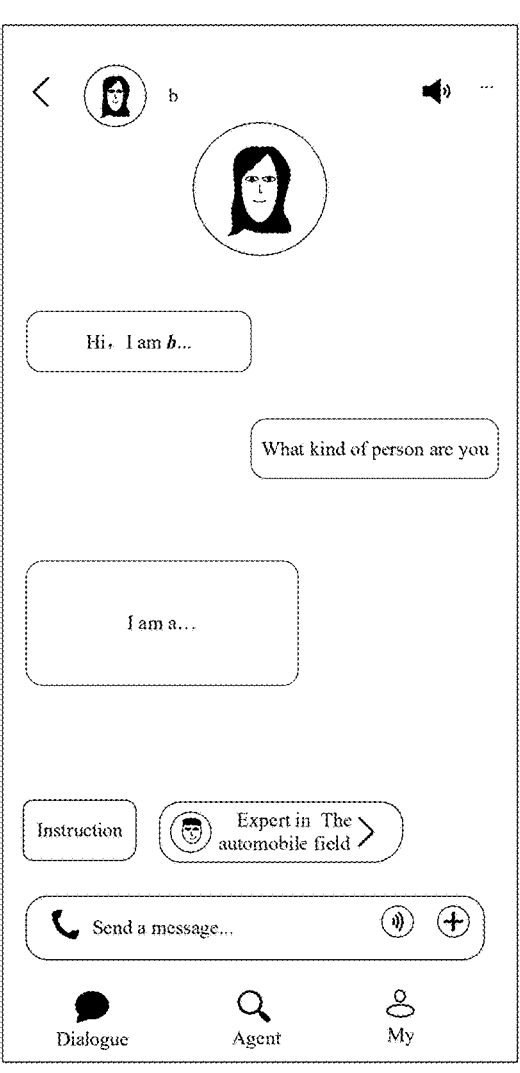
FIG. 3 is schematic diagrams of an interaction interface provided in some other embodiments of the present disclosure.

For example, as shown in FIG. 2, the Agent corresponding to "b" is the second Agent, and the interaction interface shown in FIG. 3 is displayed in response to the user triggering the operation control of the Agent corresponding to "b". As shown in FIG. 3, in the interaction interface between the user and the second Agent, the user can input "What kind of person are you", or "What kind of person are you" can be directly generated as the initial input information according to "What kind of person is b" previously input by the user, and then the second Agent "b" generates a corresponding response. In the interaction interface between the user and the second Agent, other associated interaction functions can also be displayed, for example, "An expert in the automobile field", for facilitating the user to select.

In some embodiments, the one or more operation controls of the one or more interaction functions are displayed in the interaction interface between the user and the first Agent; and/or the operation controls of the one or more interaction functions are displayed on a recommendation tag page, in response to the user triggering an interaction function entry control.

As shown in FIG. 2 or 3, the one or more operation controls of the one or more interaction functions can be displayed directly in the interaction interface. An area displaying the one or more operation controls of the one or more interaction functions supports sliding display. For example, the user can view all the interaction functions associated with interaction information through a sliding operation.

The interaction function entry control can also be displayed in the interaction interface, and in response to the user triggering the interaction function entry control, an interaction function display interface is displayed, on the recommendation tag page of which the one or more operation controls of the one or more interaction functions are displayed. As shown in FIG. 2 or 3, the interaction function entry control is, for example, an "Instruction" control. In response to the user triggering the "Instruction" control, the recommendation tag page as shown in FIG. 4 is displayed.

Figure 4:
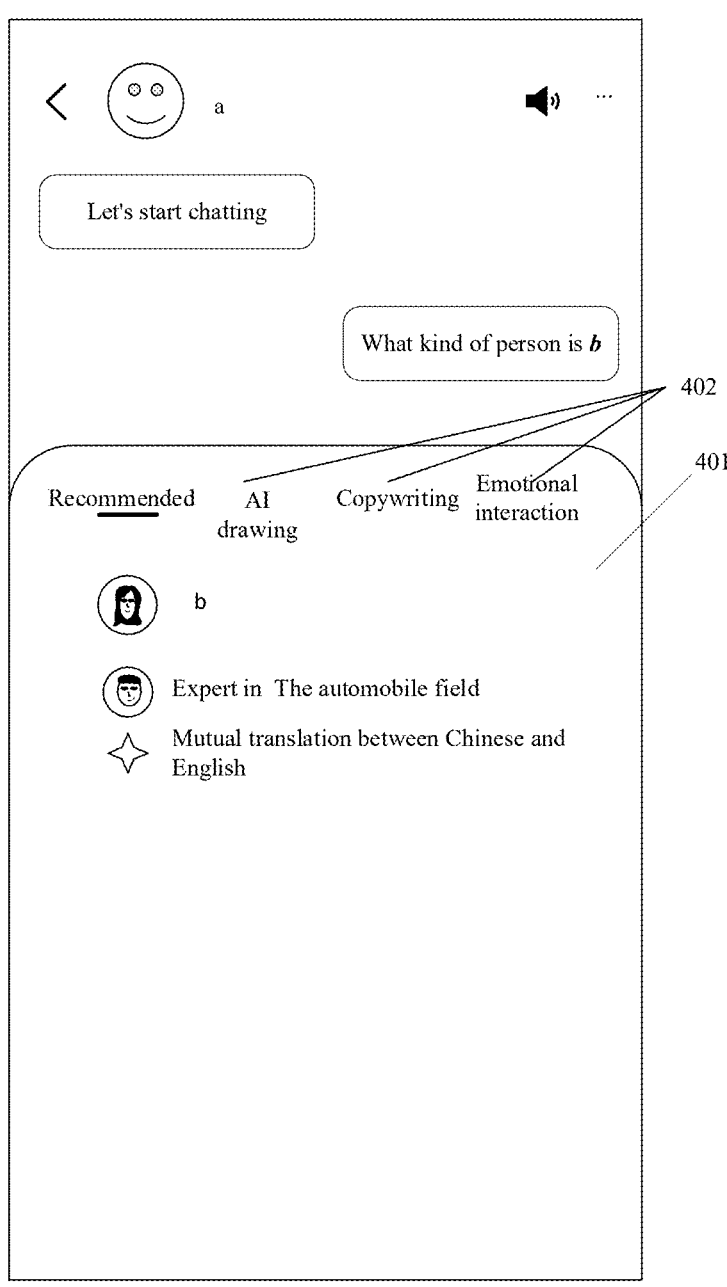
FIG. 4 is schematic diagrams of an interaction interface provided in further embodiments of the present disclosure.

As shown in FIG. 4, the recommendation tag page 401 can be displayed in a half-page state, or in other forms such as a window, floating layer or the like, on which there is no restriction here. The interaction function based on prompt information and the Agent can be displayed distinguishably in different forms. For example, as shown in FIG. 4, the Agent corresponds to an image identification, and the interaction function based on the prompt information such as "mutual translation between Chinese and English" can be identified by a preset identifier so as to facilitate the user to distinguish.

In a case where the number of the interaction functions is multiple and relatively large, only part of the interaction functions can be displayed in the interaction interface, and the multiple interaction functions associated with the interaction information can be fully displayed on the recommendation tag page, so that the user can view the interaction functions in different forms for easy selection. The display order can be determined according to the correlation between the interaction functions and the interaction information.

In some embodiments, one or more controls corresponding to one or more function classifications are displayed; in response to the user triggering a control corresponding to a target function classification in the one or more function classifications, one or more interaction functions belonging to the target function classification are displayed on a tag page of the target function classification.

The one or more function classifications here can be classified in a manner that is the same as or different from the types of the interaction functions involved in the previous embodiments. For example, the one or more function classifications here can be a type of a finer granularity.

For example, the one or more controls corresponding to the one or more function classifications are displayed in the one or more function classification display interface, or the one or more controls corresponding to one or more function classifications are displayed in the interaction interface between the user and the first Agent. As shown in FIG. 4, for example, the one or more function classifications include classifications of AI drawing, copywriting, emotional interaction, etc. The controls 402 corresponding to the function classifications can be used to switch display of interaction functions of different function classifications. In response to the user triggering the tag page of the target function classification, the tag page of the target function classification is displayed, and one or more interaction functions are displayed. On the tag pages of the one or more function classifications can be the interaction functions associated with the interaction information, can also be unassociated interaction functions, and can be interaction functions of various function classifications recommended to the user according to usage rates of all users, popularities of the interaction functions, etc.

By displaying more interaction functions of different function classifications to the user, the usage rate of the interaction functions can be increased, and the efficiency and accuracy of interactions with the user can be improved.

After finishing interacting with the interaction function corresponding to the target operation control, the user can exit the interaction function, for example, the user can switch from the interaction interface of the second Agent to the interaction interface of the first Agent, or exit directly. In some embodiments, the target operation control is displayed in the interaction interface between the user and the first Agent, in response to an ending operation of the user on the interaction function corresponding to the target operation control.

After the user finishes interacting with the interaction function corresponding to the target operation control, the target operation control can be displayed in the interaction interface of the first Agent, so that the interaction function can be directly called when the user wants to interact with the interaction function corresponding to the target operation control again, thereby improving the convenience and efficiency of the operations.

In some embodiments, in response to the user triggering a search function, the interaction function corresponding to search information is displayed according to the search information input by the user.

The user can search for an interaction function. As shown in FIG. 2, a search control 204 can be displayed for searching for an Agent or interaction function. In response to the user triggering the search control, a search input interface is displayed. In response to the search information input by the user, one or more interaction functions corresponding to the search information are determined and displayed.

Through settings of the search function, it is convenient for the user to search for the required interaction function, thereby improving the user experience.

It should be noted that the acquisition and use of user-related information in the present disclosure are all authorized by the user, and the user-related information is undergone a de-identification process.

The present disclosure also provides an interaction device, which is described below in conjunction with FIG. 5.

Figure 5:
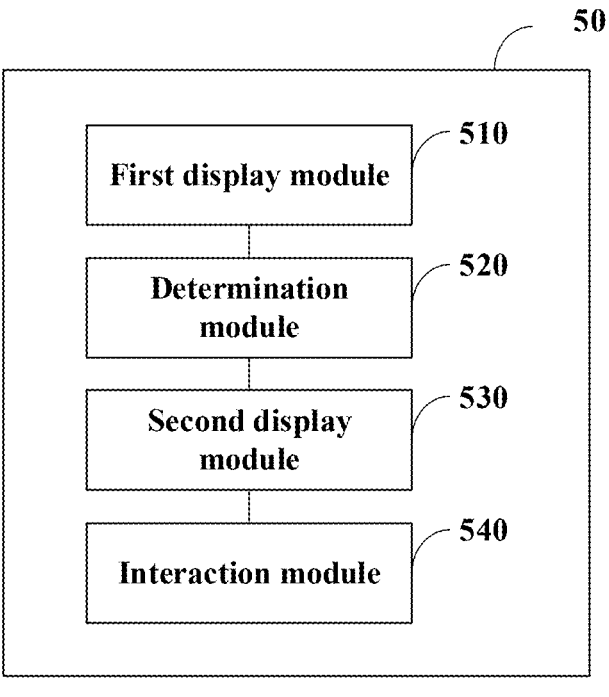
FIG. 5 is a schematic structural diagram of an interaction device provided in some embodiments of the present disclosure.

FIG. 5 is a structural diagram of some embodiments of the interaction device of the present disclosure. As shown in FIG. 5, the interaction device 50 of this embodiment includes: a first display module 510, a determination module 520, a second display module 530, and an interaction module 540.

The first display module 510 is configured to an interaction interface between a user and a first Agent.

The determination module 520 is configured to determine, according to interaction information between the user and the first Agent, one or more interaction functions associated with the interaction information, wherein the one or more interaction functions are configured to interact with the user based on an intention reflected in the interaction information.

The second display module 530 is configured to display one or more operation controls of the one or more interaction functions.

The interaction module 540 is configured to call, in response to the user triggering a target operation control in the one or more operation controls of the one or more interaction functions, an interaction function corresponding to the target operation control to interact with the user.

In some embodiments, the determination module 520 is configured to: understand the intention reflected in the interaction information and generate summary information corresponding to the interaction information, by using a machine learning model; and determine the one or more interaction functions associated with the interaction information from an interaction function library according to the summary information.

In some embodiments, the determination module 520 is configured to determine one or more types matched with the summary information according to the summary information; and select, from each of the one or more types of interaction functions in the interaction function library, an interaction function matched with the summary information, to obtain the one or more interaction functions associated with the interaction information.

In some embodiments, the determination module 520 is configured to parse the interaction information to extract a keyword of the interaction information by using a machine learning model; and determine the one or more interaction functions associated with the interaction information from the interaction function library, according to the keyword.

In some embodiments, the interaction function corresponding to the target operation control is a first interaction function corresponding to the first Agent, and the interaction module 540 is configured to obtain prompt information corresponding to the first interaction function in response to the user triggering the target operation control; generate the first interaction function corresponding to the first Agent according to the prompt information; and interact with the user based on the first interaction function by using the first Agent.

In some embodiments, the interaction module 540 is configured to display guidance information of starting the first interaction function in the interaction interface between the user and the first Agent; and display, in response to first information input by the user based on the guidance information, response information generated by the first Agent according to the first information and the first interaction function.

In some embodiments, the interaction function corresponding to the target operation control is a second interaction function corresponding to a second Agent, and the interaction module 540 is configured to call the second Agent to interact with the user based on the second interaction function, in response to the user triggering the target operation control.

In some embodiments, the interaction module 540 is configured to display an interaction interface between the user and the second Agent; and display, in response to second information input by the user in the interaction interface between the user and the second Agent, response information generated by the second Agent according to the second information and the second interaction function.

In some embodiments, the second display module 530 is configured to display the one or more operation controls of the one or more interaction functions in the interaction interface between the user and the first Agent.

In some embodiments, the second display module 530 is configured to display the operation controls of the one or more interaction functions on a recommendation tag page, in response to the user triggering an interaction function entry control.

In some embodiments, the second display module 530 is further configured to display one or more controls corresponding to one or more function classifications; and display in response to the user triggering a control corresponding to a target function classification in the one or more function classifications, one or more interaction functions belonging to the target function classification in a tag page of the target function classification.

In some embodiments, the second display module 530 is further configured to display the target operation control in the interaction interface between the user and the first Agent, in response to an ending operation of the user on the interaction function corresponding to the target operation control.

In some embodiments, the one or more interaction functions associated with interaction information comprise: one or more of an interaction function based on a role associated with the interaction information, an interaction function based on a field associated with the interaction information, an interaction function based on a scenario associated with the interaction information, and an interaction function based on a tool associated with the interaction information.

It should be noted that all units (modules) mentioned above are only logical modules divided according to specific functions realized by them, and are not used to limit specific implementation methods, for example, they can be implemented by a method of software, hardware or a combination of software and hardware. In actual implementation, all above units can be realized as independent physical entities, or can also be realized by a single entity (for example, a processor (CPU or DSP, etc.), an integrated circuit, etc.). In addition, each unit mentioned above are shown by dotted lines in the drawings, indicating that these units may not actually exist, and the operations/functions they realize can be realized by the processing circuit itself.

Moreover, although not shown, the device can also include a memory, which can store various information generated by the device and various units included in the device during operation, programs and data used for operation, data to be transmitted by the communication unit, and the like. The memory can be a volatile memory and/or a nonvolatile memory. For example, the memory may include, but is not limited to, Random Access Memory (RAM), Dynamic Random Access Memory (DRAM), Static Random Access Memory (SRAM), Read-Only Memory (ROM), and flash memory. Of course, the memory may also be located outside the device. Alternatively, although not shown, the device can also include a communication unit, which can be used to communicate with other devices. In one example, the communication unit can be implemented in an appropriate manner known in the art, including, for example, communication components such as antenna array and/or radio frequency link, various types of interfaces, communication units, and the like, which will not be elaborated here. Furthermore, the device can also include other components not shown, such as radio frequency link, baseband processing unit, network interface, processor, controller, etc., which will not be elaborated here.

Figure 6:
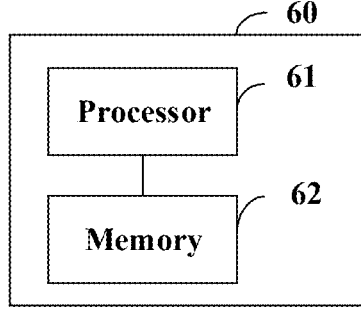
FIG. 6 is a schematic structural diagram of an electronic apparatus provided in some embodiments of the present disclosure.

Some embodiments of the present disclosure also provide an electronic apparatus. FIG. 6 shows a block diagram of some embodiments of the electronic apparatus of the present disclosure. For example, in some embodiments, the electronic apparatus 60 can be various types of apparatuses, including, for example, but not limited to, mobile terminals such as a mobile phone, notebook computer, digital broadcast receiver, PDA (Personal Digital Assistant), PAD (Tablet Computer), PMP (Portable Multimedia Player), vehicle-mounted terminal (such as vehicle-mounted navigation terminal) and fixed terminal such as digital TV, desktop computer, etc. For example, the electronic apparatus 60 can include a display panel for displaying data and/or execution results utilized in the schemes according to the present disclosure. For example, the display panel can be in various shapes, such as rectangular panel, oval panel or polygonal panel. Additionally, the display panel can be not only a flat panel, but also a curved panel or even a spherical panel.

As shown in FIG. 6, the electronic apparatus 60 of this embodiment includes a memory 61 and a processor 62 coupled to the memory 61. It should be noted that the components of the electronic apparatus 60 shown in FIG. 6 are only exemplary, not restrictive, and the electronic apparatus 60 may also have other components according to actual application requirements. The processor 62 can control other components in the electronic apparatus 60 to perform desired functions.

In some embodiments, the memory 61 is used to store one or more computer-readable instructions. When the processor 62 is used to execute computer-readable instructions, the computer-readable instructions, when executed by the processor 62, realize the interaction method according to any of the above embodiments. For the specific implementation of each step of the method and related explanations, please refer to the aforementioned embodiments, which will not be repeated here.

For example, the processor 62 and the memory 61 can communicate with each other directly or indirectly. For example, the processor 62 and the memory 61 can communicate through a network. The network can include a wireless network, a wired network, and/or any combination of wireless and wired networks. The processor 62 and the memory 61 can also communicate with each other through a system bus, which is not limited by the present disclosure.

For example, the processor 62 can be embodied as various appropriate processors, processing devices, etc., such as Central Processing Unit (CPU), Graphics Processing Unit (GPU), Network Processor (NP), etc. It can also be a Digital Signal Processor (DSP), an Application Specific Integrated Circuit (ASIC), a Field Programmable Gate Array (FPGA) or other programmable logic devices, discrete gate or transistor logic devices, and discrete hardware components. The Central Processing Unit (CPU) can be X86 or ARM architecture. For example, the memory 61 can include any combination of various forms of computer-readable storage media, such as volatile memory and/or nonvolatile memory. The memory 61 can include, for example, a system memory that stores, for example, an operating system, application programs, a Boot Loader, a database and other programs. Various applications and data can also be stored in the storage medium.

Figure 7:
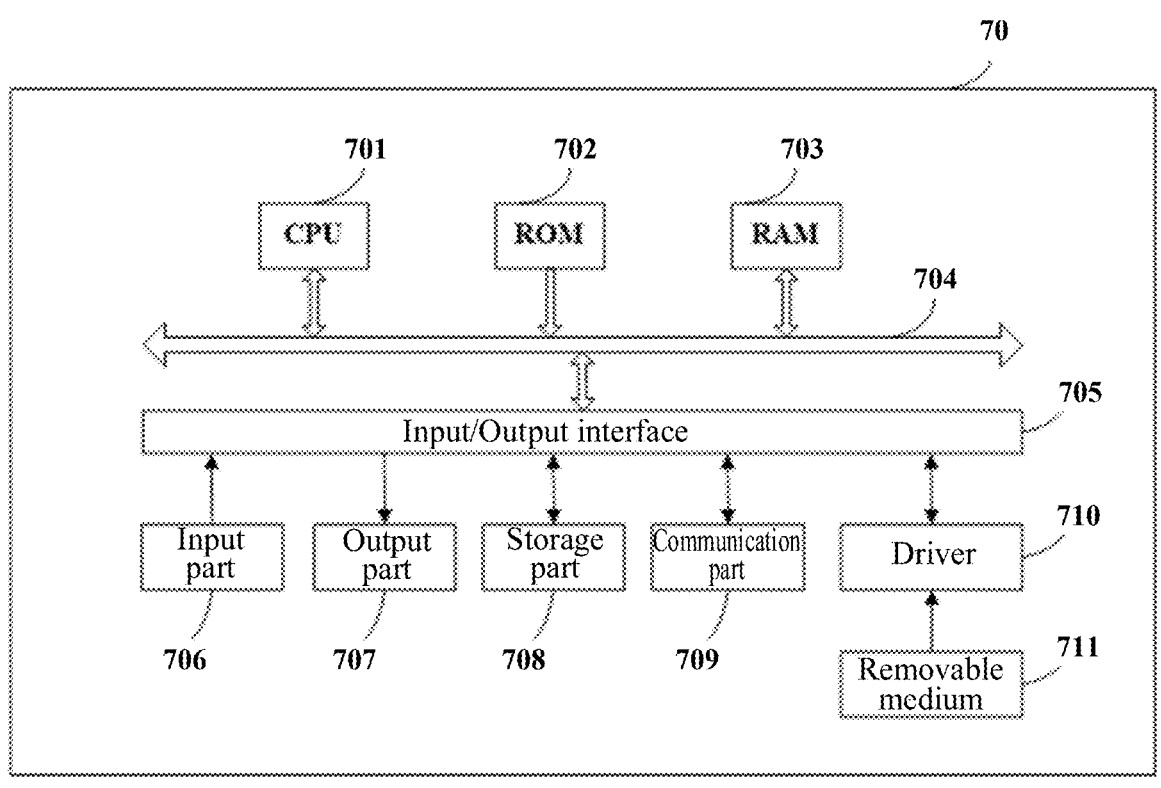
FIG. 7 is a schematic structural diagram of a computer system provided in some embodiments of the present disclosure.

In addition, according to some embodiments of the present disclosure, in the case where various operations/processes according to the present disclosure are realized by software and/or firmware, programs constituting the software can be installed from a storage medium or a network to a computer system with a dedicated hardware structure, such as the computer system (or electronic apparatus) 70 shown in FIG. 7, and the computer system can perform various functions, including such functions as those described above, when various programs are installed. FIG. 7 is a block diagram showing an example structure of a computer system that can be employed in an embodiment of the present disclosure.

In FIG. 7, the Central Processing Unit (CPU) 701 performs various processes according to a program stored in a Read-Only Memory (ROM) 702 or a program loaded from a storage part 708 into a Random Access Memory (RAM) 703. In the RAM 703, data required when the CPU 701 executes various processes and the like are also stored as necessary. The Central Processing Unit is only exemplary, and it can also be other types of processors, such as the various processors mentioned above. The ROM 702, RAM 703 and storage part 708 can be various forms of computer-readable storage media, as follows. It should be noted that although the ROM 702, the RAM 703 and the storage section 708 are shown in FIG. 7, one or more of them can be combined or located in the same or different memories or storage modules.

The CPU 701, ROM 702 and RAM 703 are connected to each other via a bus 704. An input/output interface 705 is also connected to the bus 704.

The following components are connected to the input/output interface 705: an input part 706 such as touch screen, touch pad, keyboard, mouse, image sensor, microphone, accelerometer, gyroscope, etc.; an output part 707, including a display such as Cathode Ray Tube (CRT), Liquid Crystal Display (LCD), speaker, vibrator, etc.; a storage part 708, including a hard disk, a magnetic tape, etc.; and a communication part 709, including a network interface card such as LAN card, modem, etc. The communication part 709 allows communication processing to be performed via a network such as the Internet. It is easy to understand that although various devices or modules in the computer system 70 shown in FIG. 7 communicate through the bus 704, they can also communicate through a network or other means, wherein the network can include a wireless network, a wired network, and/or any combination of the wireless network and the wired network.

A drive 710 is also connected to the input/output interface 705 as needed. A removable medium 711, such as magnetic disk, optical disk, magneto-optical disk, semiconductor memory, etc., is mounted on the drive 710 as needed, so that a computer program read from it is installed in the storage part 708 as needed.

In the case where the above-mentioned series of processes are realized by software, a program constituting the software may be installed from a network such as the Internet or a storage medium such as the removable medium 711.

According to embodiments of the present disclosure, the process described above with reference to the flowchart can be implemented as a computer software program. For example, the embodiment of the present disclosure includes a computer program product, which includes a computer program carried on a computer-readable medium, and the computer program includes program code for executing the method shown in the flowchart. In such an embodiment, the computer program can be downloaded and installed from the network through the communication part 709, or installed from the storage part 708, or installed from the ROM 702.

When the computer program is executed by the CPU 701, the above functions defined in the interaction method of the embodiments of the present disclosure are executed.

It should be noted that in the context of the present disclosure, the computer-readable medium can be a tangible medium, which can include or store a program for use by or in combination with an instruction execution system, device or apparatus. The computer-readable medium can be a computer-readable signal medium or a computer-readable storage medium or any combination of both. The computer-readable storage medium can be, for example, but not limited to: an electrical, magnetic, optical, electromagnetic, infrared, or semiconductor system, device or component, or any combination of the above. More specific examples of the computer-readable storage medium can include, but are not limited to, an electrical connection with one or more wires, a portable computer disk, a hard disk, a Random Access Memory (RAM), a Read-Only Memory (ROM), an Erasable Programmable Read-Only Memory (EPROM or flash memory), an optical fiber, a portable Compact Disk Read-Only Memory (CD-ROM), an optical storage device, a magnetic storage device, or any suitable combination of the above. In the present disclosure, a computer-readable storage medium can be any tangible medium including or storing a program, which can be used by or in combination with an instruction execution system, device or component. In the present disclosure, a computer-readable signal medium can include a data signal propagated in baseband or as part of a carrier wave, in which computer-readable program codes are carried. This propagated data signal can take many forms, including but not limited to electromagnetic signals, optical signals or any suitable combination of the above. A computer-readable signal medium can also be any computer-readable medium other than a computer-readable storage medium, which can send, propagate or transmit a program for use by or in connection with an instruction execution system, device or component. The program code included in the computer-readable medium can be transmitted by any suitable medium, including but not limited to: wires, optical cables, RF (radio frequency) and the like, or any suitable combination of the above.

The computer-readable medium can be included in the above electronic apparatus; or it can exist alone without being assembled into the electronic apparatus.

In some embodiments, there is also provided a computer program, including: instructions which, when executed by a processor, cause the processor to perform the interaction method of any of the above embodiments. For example, the instructions can be embodied in computer program code.

In the embodiments of the present disclosure, the computer program codes for performing the operations of the present disclosure can be written in one or more programming languages or their combinations, including but not limited to object-oriented programming languages such as Java, Smalltalk, C++, and conventional procedural programming languages such as "C" or similar programming languages. The program codes can be completely executed on the user's computer, partially executed on the user's computer, executed as an independent software package, partially executed on the user's computer and partially executed on a remote computer, or completely executed on a remote computer or server. In the case involving a remote computer, the remote computer can be connected to a user computer through any kind of network (including a Local Area Network (LAN) or a Wide Area Network (WAN)), or can be connected to an external computer (for example, through the Internet using an Internet service provider).

The flowcharts and block diagrams in the drawings illustrate architecture, functions and operations of possible implementations of the systems, methods and computer program products according to various embodiments of the present disclosure. In this regard, each block in the flowchart or block diagram can represent a module, a program segment, or a part of codes that includes one or more executable instructions for implementing specified logical functions. It should also be noted that in some alternative implementations, the functions noted in the blocks may occur in a different order than those noted in the drawings. For example, two blocks shown in succession may actually be executed substantially in parallel, and they may sometimes be executed in the reverse order, depending on the functions involved. It should also be noted that each block in the block diagrams and/or flowcharts, and combinations of blocks in the block diagrams and/or flowcharts, can be implemented by a dedicated hardware-based system that performs specified functions or operations, or by a combination of dedicated hardware and computer instructions.

The modules, parts or units described in the embodiments of the present disclosure can be realized by software or hardware. Among them, the name of the module, part or unit does not constitute the limitation on the module, part or unit itself in some cases.

The functions described above herein can be at least partially performed by one or more hardware logic components. For example, without limitation, exemplary hardware logic components that can be used include: Field Programmable Gate Array (FPGA), Application Specific Integrated Circuit (ASIC), Application Specific Standard Product (ASSP), System on Chip (SOC), Complex Programmable Logic Device (CPLD) and so on.

According to some embodiments of the present disclosure, an interaction method is provided, comprising: displaying an interaction interface between a user and a first Agent; determining, according to interaction information between the user and the first Agent, one or more interaction functions associated with the interaction information, wherein the one or more interaction functions are configured to interact with the user based on an intention reflected in the interaction information; displaying one or more operation controls of the one or more interaction functions; and calling, in response to the user triggering a target operation control in the one or more operation controls of the one or more interaction functions, an interaction function corresponding to the target operation control to interact with the user.

In some embodiments, the determining, according to interaction information between the user and the first Agent, one or more interaction functions associated with the interaction information comprises: understanding the intention reflected in the interaction information and generating summary information corresponding to the interaction information, by using a machine learning model; and determining the one or more interaction functions associated with the interaction information from an interaction function library according to the summary information.

In some embodiments, the determining the one or more interaction functions associated with the interaction information from an interaction function library according to the summary information comprises: determining one or more types matched with the summary information according to the summary information; and selecting, from each of the one or more types of interaction functions in the interaction function library, an interaction function matched with the summary information, to obtain the one or more interaction functions associated with the interaction information.

In some embodiments, the determining, according to interaction information between the user and the first Agent, one or more interaction functions associated with the interaction information comprises: parsing the interaction information to extract a keyword of the interaction information by using a machine learning model; and determining the one or more interaction functions associated with the interaction information from the interaction function library, according to the keyword.

In some embodiments, the interaction function corresponding to the target operation control is a first interaction function corresponding to the first Agent, and the calling, in response to the user triggering a target operation control in the one or more operation controls of the one or more interaction functions, an interaction function corresponding to the target operation control to interact with the user comprises: obtaining prompt information corresponding to the first interaction function in response to the user triggering the target operation control; generating the first interaction function corresponding to the first Agent according to the prompt information; and interacting with the user based on the first interaction function by using the first Agent.

In some embodiments, the interacting with the user based on the first interaction function by using the first Agent comprises: displaying guidance information of starting the first interaction function in the interaction interface between the user and the first Agent; and displaying, in response to first information input by the user based on the guidance information, response information generated by the first Agent according to the first information and the first interaction function.

In some embodiments, the interaction function corresponding to the target operation control is a second interaction function corresponding to a second Agent, and the calling, in response to the user triggering a target operation control in the one or more operation controls of the one or more interaction functions, an interaction function corresponding to the target operation control to interact with the user comprises: calling the second Agent to interact with the user based on the second interaction function, in response to the user triggering the target operation control.

In some embodiments, the calling the second Agent to interact with the user based on the second interaction function, in response to the user triggering the target operation control comprises: displaying an interaction interface between the user and the second Agent; and displaying, in response to second information input by the user in the interaction interface between the user and the second Agent, response information generated by the second Agent according to the second information and the second interaction function.

In some embodiments, the displaying one or more operation controls of the one or more interaction functions comprises: displaying the one or more operation controls of the one or more interaction functions in the interaction interface between the user and the first Agent.

In some embodiments, the displaying one or more operation controls of the one or more interaction functions comprises: displaying the operation controls of the one or more interaction functions on a recommendation tag page, in response to the user triggering an interaction function entry control.

In some embodiments, the interaction method further comprises: displaying one or more controls corresponding to one or more function classifications; and displaying, in response to the user triggering a control corresponding to a target function classification in the one or more function classifications, one or more interaction functions belonging to the target function classification in a tag page of the target function classification.

In some embodiments, the interaction method further comprises: displaying the target operation control in the interaction interface between the user and the first Agent, in response to an ending operation of the user on the interaction function corresponding to the target operation control.

In some embodiments, the interaction method further comprises: the one or more interaction functions associated with interaction information comprise: one or more of an interaction function based on a role associated with the interaction information, an interaction function based on a field associated with the interaction information, an interaction function based on a scenario associated with the interaction information, and an interaction function based on a tool associated with the interaction information.

According to some other embodiments of the present disclosure, an interaction device is provided, comprising: a first display module configured to display an interaction interface between a user and a first Agent; a determination module configured to: determining, according to interaction information between the user and the first Agent, one or more interaction functions associated with the interaction information; a second display module configured to display one or more operation controls of the one or more interaction functions; and an interaction module configured to call, in response to the user triggering a target operation control in the one or more operation controls of the one or more interaction functions, an interaction function corresponding to the target operation control to interact with the user.

According to further embodiments of the present disclosure, an electronic apparatus is provided, comprising one or more processors; and one or more memories, coupled to the one or more processors, for storing instructions which, when executed by the one or more processors, cause the one or more processors to perform the interaction method provided in any of the embodiments of the present disclosure.

According to still further embodiments of the present disclosure, a computer-readable storage medium is provided, on which a computer program is stored, which, when executed by a processor, causes the processor to perform the interaction method provided in any of the embodiments of the present disclosure.

According to yet further embodiments of the present disclosure, a computer program product is provided, comprising instructions which, when executed by a processor, cause the processor to implement the interaction method provided in any of the embodiments of the present disclosure.

According to still further embodiments of the present disclosure, a computer program is provided, comprising instructions which, when executed by a processor, cause the processor to implement the interaction method provided in any of the embodiments of the present disclosure.

The above descriptions are only some embodiments of the present disclosure and explanations of the applied technical principles. It should be understood by those skilled in the art that the disclosing scope involved in the present disclosure is not limited to the technical schemes formed by the specific combination of the above technical features, but also covers other technical schemes formed by any combination of the above technical features or their equivalent features if without departing from the above disclosure concept. For example, the above features are replaced with (but not limited to) technical features with similar functions disclosed in the present disclosure to form a technical scheme.

In the description provided herein, numerous specific details are set forth. However, it is understood that embodiments of the present invention can be practiced without these specific details. In other instances, well-known methods, structures and techniques have not been shown in detail in order not to obscure the understanding of this description.

Furthermore, although the operations are depicted in a particular order, this should not be understood as requiring that these operations must be performed in the particular order shown or in a sequential order. Under certain circumstances, multitasking and parallel processing may be beneficial. Likewise, although several specific implementation details are included in the above discussion, these should not be construed as limiting the scope of the present disclosure. Some features described in the context of separate embodiments can also be combined in a single embodiment. On the contrary, various features described in the context of a single embodiment can also be implemented in multiple embodiments individually or in any suitable sub-combination.

Although some specific embodiments of the present disclosure have been elaborated through examples, it should be understood by those skilled in the art that the above examples are only for illustration and are not intended to limit the scope of the present disclosure. It should be understood by those skilled in the art that the above embodiments can be modified in the case of without departing from the scope and spirit of the present disclosure. The scope of the present disclosure is defined by the appended claims.

What is claimed is:

1. An interaction method, comprising:
displaying an interaction interface between a user and a first Agent, wherein the first Agent is realized based on Artificial Intelligence technology;
understanding an intention reflected in interaction information between the user and the first Agent and generating summary information corresponding to the interaction information;
determining one or more types matched with the summary information according to the summary information;
selecting, from each of the one or more types of interaction functions, an interaction function matched with the summary information, to obtain one or more interaction functions associated with the interaction information, wherein the interaction information comprises dialogue information and the one or more interaction functions are configured to interact with the user based on the intention reflected in the interaction information;
displaying one or more operation controls of the one or more interaction functions; and
calling, in response to the user triggering a target operation control in the one or more operation controls of the one or more interaction functions, an interaction function corresponding to the target operation control to interact with the user.

2. The interaction method according to claim 1, wherein the interaction function corresponding to the target operation control is a first interaction function corresponding to the first Agent, and the calling, in response to the user triggering a target operation control in the one or more operation controls of the one or more interaction functions, an interaction function corresponding to the target operation control to interact with the user comprises:
obtaining prompt information corresponding to the first interaction function in response to the user triggering the target operation control;

generating the first interaction function corresponding to the first Agent according to the prompt information; and
interacting with the user based on the first interaction function by using the first Agent.

3. The interaction method according to claim 2, wherein the interacting with the user based on the first interaction function by using the first Agent comprises:
displaying guidance information of starting the first interaction function in the interaction interface between the user and the first Agent; and
displaying, in response to first information input by the user based on the guidance information, response information generated by the first Agent according to the first information and the first interaction function.

4. The interaction method according to claim 1, wherein the interaction function corresponding to the target operation control is a second interaction function corresponding to a second Agent, and the calling, in response to the user triggering a target operation control in the one or more operation controls of the one or more interaction functions, an interaction function corresponding to the target operation control to interact with the user comprises:
calling the second Agent to interact with the user based on the second interaction function, in response to the user triggering the target operation control.

5. The interaction method according to claim 4, wherein the calling the second Agent to interact with the user based on the second interaction function, in response to the user triggering the target operation control comprises:
displaying an interaction interface between the user and the second Agent; and
displaying, in response to second information input by the user in the interaction interface between the user and the second Agent, response information generated by the second Agent according to the second information and the second interaction function.

6. The interaction method according to claim 1, wherein the displaying one or more operation controls of the one or more interaction functions comprises:
displaying the one or more operation controls of the one or more interaction functions in the interaction interface between the user and the first Agent.

7. The interaction method according to claim 1, wherein the displaying one or more operation controls of the one or more interaction functions comprises:
displaying the operation controls of the one or more interaction functions on a recommendation tag page, in response to the user triggering an interaction function entry control.

8. The interaction method according to claim 7, further comprising:
displaying one or more controls corresponding to one or more function classifications; and
displaying, in response to the user triggering a control corresponding to a target function classification in the one or more function classifications, one or more interaction functions belonging to the target function classification in a tag page of the target function classification.

9. The interaction method according to claim 1, further comprising:
displaying the target operation control in the interaction interface between the user and the first Agent, in response to an ending operation of the user on the interaction function corresponding to the target operation control.

10. The interaction method according to claim 1, wherein the one or more interaction functions associated with interaction information comprise: one or more of an interaction function based on a role associated with the interaction information, an interaction function based on a field associated with the interaction information, an interaction function based on a scenario associated with the interaction information, and an interaction function based on a tool associated with the interaction information.

11. An electronic apparatus, comprising:

one or more processors; and one or more memories, coupled to the one or more processors, for storing instructions which, when executed by the one or more processors, cause the one or more processors to:

display an interaction interface between a user and a first Agent, wherein the first Agent is realized based on Artificial Intelligence technology;

understand an intention reflected in interaction information between the user and the first Agent and generate summary information corresponding to the interaction information;

determine one or more types matched with the summary information according to the summary information:

select, from each of the one or more types of interaction functions, an interaction function matched with the summary information, to obtain one or more interaction functions associated with the interaction information, wherein the interaction information comprises dialogue information and the one or more interaction functions are configured to interact with the user based on an intention reflected in the interaction information;

display one or more operation controls of the one or more interaction functions; and call, in response to the user triggering a target operation control in the one or more operation controls of the one or more interaction functions, an interaction function corresponding to the target operation control to interact with the user.

12. The electronic apparatus according to claim 11, wherein the interaction function corresponding to the target operation control is a first interaction function corresponding to the first Agent, and the calling, in response to the user triggering a target operation control in the one or more operation controls of the one or more interaction functions, an interaction function corresponding to the target operation control to interact with the user comprises:

obtaining prompt information corresponding to the first interaction function in response to the user triggering the target operation control;

generating the first interaction function corresponding to the first Agent according to the prompt information; and interacting with the user based on the first interaction function by using the first Agent.

13. The electronic apparatus according to claim 12, wherein the interacting with the user based on the first interaction function by using the first Agent comprises:

displaying guidance information of starting the first interaction function in the interaction interface between the user and the first Agent; and displaying, in response to first information input by the user based on the guidance information, response information generated by the first Agent according to the first information and the first interaction function.

14. The electronic apparatus according to claim 11, wherein the displaying one or more operation controls of the one or more interaction functions comprises:

displaying the operation controls of the one or more interaction functions on a recommendation tag page, in response to the user triggering an interaction function entry control.

15. The electronic apparatus according to claim 14, wherein the instructions when executed by the one or more processors, cause the one or more processors further to:

display one or more controls corresponding to one or more function classifications; and display, in response to the user triggering a control corresponding to a target function classification in the one or more function classifications, one or more interaction functions belonging to the target function classification in a tag page of the target function classification.

16. A non-transitory computer-readable storage medium, on which a computer program is stored, wherein the program when executed by a processor, causes the processor to:

display an interaction interface between a user and a first Agent, wherein the first Agent is realized based on Artificial Intelligence technology;

understand an intention reflected in interaction information between the user and the first Agent and generate summary information corresponding to the interaction information;

determine one or more types matched with the summary information according to the summary information;

select, from each of the one or more types of interaction functions, an interaction function matched with the summary information, to obtain one or more interaction functions associated with the interaction information, wherein the interaction information comprises dialogue information and the one or more interaction functions are configured to interact with the user based on an intention reflected in the interaction information;

display one or more operation controls of the one or more interaction functions; and call, in response to the user triggering a target operation control in the one or more operation controls of the one or more interaction functions, an interaction function corresponding to the target operation control to interact with the user.

17. The non-transitory computer-readable storage medium according to claim 16, wherein the interaction function corresponding to the target operation control is a first interaction function corresponding to the first Agent, and the calling, in response to the user triggering a target operation control in the one or more operation controls of the one or more interaction functions, an interaction function corresponding to the target operation control to interact with the user comprises:

obtaining prompt information corresponding to the first interaction function in response to the user triggering the target operation control;

generating the first interaction function corresponding to the first Agent according to the prompt information; and interacting with the user based on the first interaction function by using the first Agent.

18. The non-transitory computer-readable storage medium according to claim 17, wherein the interacting with the user based on the first interaction function by using the first Agent comprises:

displaying guidance information of starting the first interaction function in the interaction interface between the user and the first Agent; and displaying, in response to first information input by the user based on the guidance information, response information generated by the first Agent according to the first information and the first interaction function.

19. The non-transitory computer-readable storage medium according to claim 16, wherein the displaying one or more operation controls of the one or more interaction functions comprises:

displaying the operation controls of the one or more interaction functions on a recommendation tag page, in response to the user triggering an interaction function entry control.

20. The non-transitory computer-readable storage medium according to claim 19, wherein the computer program when executed by the one or more processors, causes the processor further to:

display one or more controls corresponding to one or more function classifications; and display, in response to the user triggering a control corresponding to a target function classification in the one or more function classifications, one or more interaction functions belonging to the target function classification in a tag page of the target function classification.

\* \* \* \* \*